United States Patent [19]

Dunham

[11] Patent Number: 5,262,698
[45] Date of Patent: Nov. 16, 1993

[54] COMPENSATION FOR FIELD EMISSION DISPLAY IRREGULARITIES

[75] Inventor: Peter C. Dunham, Framingham, Mass.

[73] Assignee: Raytheon Company, Lexington, Mass.

[21] Appl. No.: 785,679

[22] Filed: Oct. 31, 1991

[51] Int. Cl.$^5$ .............................................. G09G 3/10
[52] U.S. Cl. .............................. 315/169.1; 315/169.3; 315/169.4; 345/30; 345/147
[58] Field of Search ................ 315/169.1, 169.3, 169.4; 313/495, 496, 442, 309; 340/752, 783, 768, 713

[56] References Cited

U.S. PATENT DOCUMENTS

| | | | |
|---|---|---|---|
| 4,020,381 | 4/1977 | Oess et al. | 313/309 X |
| 4,296,357 | 10/1981 | Hirayama et al. | 315/169.4 |
| 5,003,228 | 3/1991 | Hada et al. | 315/169.4 |
| 5,015,912 | 5/1991 | Spindt et al. | 340/752 X |
| 5,086,257 | 2/1993 | Gay et al. | 315/169.4 |
| 5,103,144 | 4/1993 | Dunham | 315/336 X |

*Primary Examiner*—Eugene R. LaRoche
*Assistant Examiner*—Son Dinh
*Attorney, Agent, or Firm*—Walter F. Dawson; Richard M. Sharkansky

[57] ABSTRACT

An apparatus is disclosed for controlling the brightness of a matrix-addressed flat panel CRT display of a type having intersecting column and row conductors forming, respectively, the gate and cathode electrodes of a field electron emission array. The brightness control is effected by controlling the voltages applied to the drive lines of the intersecting conductors. A waveform having progressively increasing voltage steps is sequentially applied to the row conductors. The voltages at each of the steps are preferably selected to enable electron beam currents which provide brightness levels which are twice the brightness of the previous step. Binary-coded brightness control signals are simultaneously applied to all of the column conductors. The voltages of the stepped waveform and the binary-coded signals comprise a combination of video information data and correction data which compensate for irregularities in the current emitting structure at the selected conductors. The combined voltages at the intersections of the selected conductors cause a sequence of electron emissions onto luminescing means which result in a corresponding sequence of illumination intervals.

18 Claims, 9 Drawing Sheets

COMPENSATION FOR FIELD EMISSION DISPLAY IRREGULARITIES

BACKGROUND OF THE INVENTION

The present invention relates generally to matrix-addressed flat panel cathode-ray tube (CRT) displays utilizing field emission cathodes and, more particularly, to a circuit for providing brightness compensation of such a display in order to mitigate the effects of emitter irregularities which result in brightness variations.

Cathode-ray tubes are widely used in display monitors for computers, television sets, etc. to provide visual displays of information. This wide usage may be ascribed to the favorable quality of the display which is achievable with cathode-ray tubes, i.e., color, brightness, contrast, and resolution. One major feature of a CRT permitting these qualities to be achieved is the use of a luminescent phosphor coating on a transparent face. Conventional CRTs, however, have the disadvantage that they require significant physical depth, i.e., space behind the actual screen, making them large and cumbersome. There are a number of important applications in which this depth requirement is deleterious. For example, the depth available for many compact portable computer displays and operational displays precludes the use of CRTs. Thus, there has been significant interest in an effort to provide satisfactory so-called "flat panel displays" or "quasi flat panel displays" not having the depth requirement of a typical CRT, while having comparable or better display characteristics, e.g., brightness, resolution, versatility in display, power requirements, etc. These attempts, while producing flat panel displays that are useful for some applications have not produced a display that can compare to a conventional CRT.

A flat panel display arrangement is disclosed in U.S. Pat. No. 4,857,799, "Matrix-Addressed Flat Panel Display," issued Aug. 15, 1989, to Charles A. Spindt et al. This arrangement includes a matrix array of individually addressable light generating means of the cathodoluminescent type having cathodes combined with luminescing means of the CRT type which reacts to electron bombardment by emitting visible light. Each cathode is itself an array of field emission cathodes on a backing plate, and the luminescing means is provided as a phosphor coating on a transparent face plate which is closely spaced to the cathodes.

The backing plate disclosed in the Spindt et al. patent includes a large number of vertical conductive stripes which are individually addressable. Each cathode includes a multiplicity of spaced-apart, cone-shaped, electron emitting tips which project outwardly from the vertical stripes on the backing plate toward the face plate. An electrically conductive gate electrode arrangement is positioned adjacent to the tips to generate and control the electron emission. The gate electrode arrangement comprises a large number of individually addressable, horizontal stripes which are orthogonal to the cathode stripes, and which include apertures through which emitted electrons may pass. The gate electrode stripes are common to a full row of pixels extending across the front face of the backing structure, electrically isolated from the arrangement of cathode stripes. The anode is a thin film of an electrically conductive transparent material, such as indium tin oxide, which covers the interior surface of the face plate.

The matrix array of cathodes may be activated by addressing the orthogonally related cathodes and gates in a generally conventional matrix-addressing scheme. The appropriate cathodes of the display along a selected stripe, such as along one column, may be energized while the remaining cathodes are not energized. Gates of a selected stripe orthogonal to the selected cathode stripe ma also be energized while the remaining gates are not energized, with the result that the cathodes and gates of a pixel at the intersection of the selected horizontal and vertical stripes may be simultaneously energized, emitting electrons so as to provide the desired pixel display.

The Spindt et al. patent teaches that it is preferable that an entire row of pixels be simultaneously energized, rather than energization of individual pixels. According to this scheme, sequential lines are energized to provide a display frame, as opposed to sequential energization of individual pixels in a raster scan manner. This extends the duty cycle for each panel in order to provide enhanced brightness.

The present invention relates to the control of the brightness at each pixel, which is a function of the intensity of electron beam current impinging on the phosphor coating of the anode. One technique, currently in use in matrix-addressed, flat panel CRT displays, employs pulse widt modulation to control the brightness at each display pixel. This technique divides the line period into a number of intervals, wherein the time durations of each of these intervals within a single period are related according to a binary progression. Thus, for a line period comprising four intervals having time durations of one, two, four and eight time units, it is possible to provide from zero to fifteen time units of illumination at each pixel within a line period. The integrating effect of the human optic system and the retentive qualities of the phosphors on the display screen combine to translate these different-length time durations of illumination into different levels of brightness intensities.

A matrix-addressed, flat panel CRT display providing an extended range of brightnesses is disclosed in U.S. Pat. application Ser. No. 590,870, filed Oct. 1, 1990, for Peter C. Dunham, and assigned to the same assignee as the present invention. In this display the brightness control is effected by controlling both the duty cycle and the voltage applied to the drive lines of the intersecting conductors. A periodic staircase waveform having progressively increasing voltage steps is sequentially applied to the row conductors. Binary-coded video brightness data are simultaneously applied to all of the column conductors. The combined voltages at the intersections of the selected conductors cause a sequence of electron emissions onto luminescing means which results in a corresponding sequence of illumination intervals.

In one method for providing the cone-shaped tips of the electron emitting structure, a highly collimated beam of vaporized metal, illustratively molybdenum, impinges substantially normally onto a substrate, having a metal film control grid electrode with micron-sized apertures over small cavities. A second beam, illustratively aluminum oxide vapor, impinges simultaneously onto the substrate, but at a very shallow angle. During this dual deposition process, the substrate is rotated about its central axis. The net effect is that the apertures are gradually closed by the deposition of composite material (the molybdenum and aluminum oxide) while the metal cones (the cathode electrodes) are formed within the microcavities by the molybdenum vapor beam. The composite material surrounding the cones and closing the apertures is later removed by selective chemical etching.

In flat panel CRT displays of the type described above, it has been found that brightness variations across the display must be maintained to less than ±10% in order to provide an image of acceptable quality. A very significant contributor to brightness uniformity is the physical uniformity of the cathodes which results from the manufacturing process. Since the molybdenum cones in the above-described process tend to grow toward the source of the molybdenum vapor, the deposition beam must be highly collimated. Thus, in order to obtain uniform emitters over an area of sufficient size to be useful as a display, e.g., eight cm by eight cm or larger, the molybdenum must be evaporated from a considerable distance, typically 90 cm or more. Nevertheless, variations in the molybdenum cones resulting from typical manufacturing processes, which are often extensions of semiconductor manufacturing, are virtually unavoidable. It has been found that these variations tend to be spherical in form across the display surface.

SUMMARY OF THE INVENTION

It is therefore an object of the present invention to provide an improved flat panel cathode-ray tube (CRT).

It is an additional object of the present invention to provide a matrix-addressed, flat panel CRT display having circuitry to compensate for variations in brightness.

In accordance with the principles of the present invention, there is disclosed an apparatus for use in a flat panel display, the display comprising a backing structure having a surface including a first plurality of substantially parallel conductors disposed across the surface and a second plurality of substantially parallel conductors disposed across the surface. The conductors of the first plurality intersect the conductors of the second plurality, but are electrically isolated from them. The display further comprises means at each intersection of the first and second pluralities of conductors for emitting an electron beam current therefrom in response to a potential difference between the intersecting conductors. The disclosed apparatus is for controlling the electron beam current from the emitting means at each of the intersections. The apparatus comprises first source means coupled to the first plurality of conductors for generating a first signal individually thereto, the first signal comprising a plurality of steps of different voltage levels. The apparatus further includes second source means coupled to the second plurality of conductors for generating a brightness control signal thereto, the brightness control signal being driven between a first reference potential and a second reference potential in response to a binary-coded, video input signal, wherein the voltage difference between the voltage level steps of the first signal coupled individually to the first plurality of conductors and the second reference potential of the brightness control signal coupled to the second plurality of conductors generates an electron beam current from the emitting means at the intersection of the conductor of the first plurality coupled to the first source means and the conductor of the second plurality coupled to the second source means, the electron beam current varying in accordance with the voltage difference. Finally, the apparatus includes means coupled to one of the first and second source means for adjusting the magnitude of the signal coupled therefrom, wherein the adjustment is a predetermined quantity specific to each of the plurality of conductors coupled to the one source means.

In accordance with a preferred embodiment of the present invention, the adjusting means is coupled to the first source means and to the second source means, the adjusting means providing adjustment of the voltage levels of each of the plurality of steps for each of the first plurality of conductors, and also providing adjustment of the binary-coded, video input signal for each of the second plurality of conductors.

In accordance with an additional embodiment of the present invention, the adjusting means is coupled to the second source means, the adjusting means providing adjustment of the binary-coded, video input signal for each of the intersections of the first and second pluralities of conductors.

The aforementioned apparatus is preferably included in a flat panel display further comprising a face structure having a second surface adjacent the backing structure surface including means on the second surface responsive to electron beam current for providing luminescence.

With this arrangement, the brightness of the individual pixels of a matrix-addressed, flat panel display may be controlled by applying non-uniform voltages to each axis of the addressing matrix, thereby compensating for manufacturing variations which cause irregularities in brightness on the display. Unwanted variations in brightness are corrected by appropriate adjustments in the control voltage. Adjustments to the control voltage are provided by digital and analog circuits according to data stored in memory devices; these adjustments are either fixed for a given panel size or production process, or are unique and associated with each individual panel.

BRIEF DESCRIPTION OF THE DRAWINGS

Other features and advantages of the present invention will be more fully understood from the following detailed description of the preferred embodiment, the appended claims, and the accompanying drawings, in which:

FIG. 7 illustrates an illustrative logical organization of a PROM used to control row conductor voltages in the embodiment of FIG. 4;

FIG. 8 illustrates an illustrative logical organization of a PROM used to control column conductor brightness data in the embodiment of FIG. 4;

DESCRIPTION OF THE PREFERRED EMBODIMENT

Figure 1:
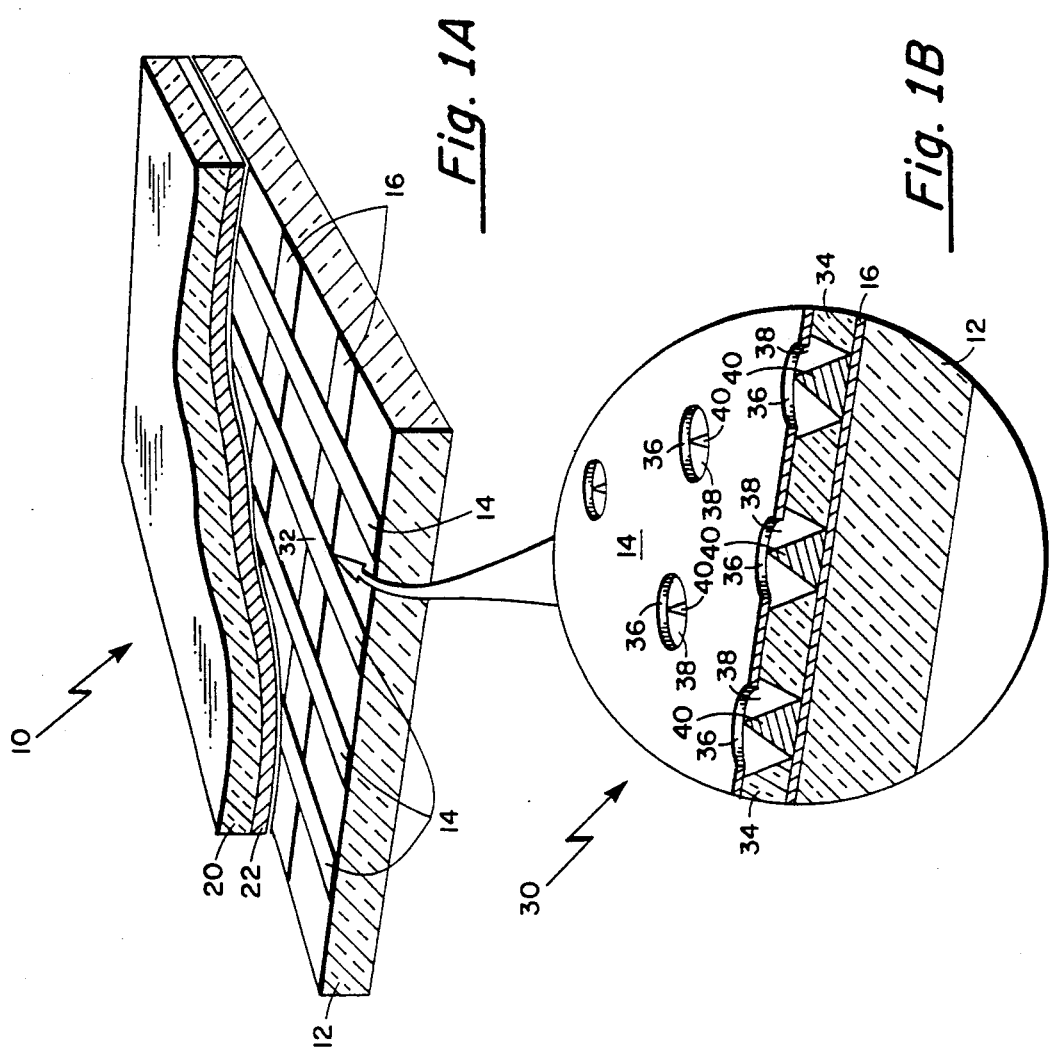
FIG. 1 is a partly cutaway drawing of a typical matrix-addressed flat panel display in which the brightness control apparatus of the present invention may be included.

Referring to FIG. 1, there is shown a partially cut-away view of a flat panel display 10 including a magnified view of a portion thereof. Flat panel display 1 includes a back glass plate 12 having a crisscrossed pattern of electrically-conductive columns 14, forming the cathode electrodes, and electrically-conductive rows 16, forming the gate electrodes. This pattern is overlaid by, but spaced from, a front glass plate 20 having a phosphor coating 22 on the inner surface thereof, comprising the anode electrode.

The portion shown magnified in FIG. 1 is a sectional view of an intersection 32 of a row and column, further depicting the individual elements of the gate and cathode electrodes of an illustrative electron emission apparatus 30 present at every such intersection 32. The electron emission apparatus 30 at intersection 32 comprises the conductive column 14 and the conductive row 16, separated by an insulating layer 34. Further at each intersection 32 are a plurality of generally-circular apertures 36 in column layer 14, under which there are wells 38 formed in insulating layer 34, hollowed out down to the level of row layer 16.

Within each well 38 there is a conical metallic structure 40 which is electrically coupled to conductive row layer 16. This conical structure 40 is the part of the cathode electrode from which the field-induced electron emission takes place. The tip of each conical structure 40 is approximately at the upper level of column layer 14, and is preferably centered within aperture 36.

Figure 2:
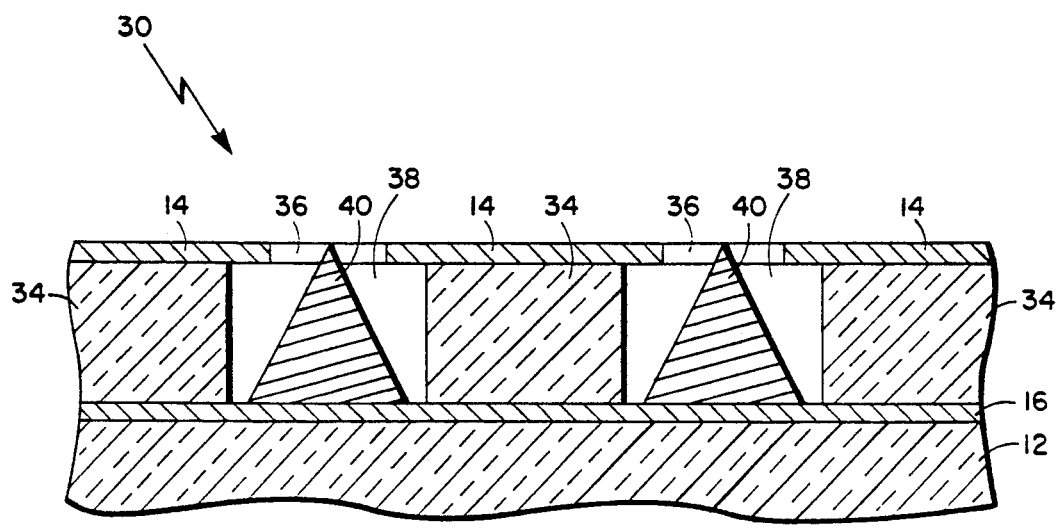
FIG. 2 is a sketch in cross section of an array of elements comprising an electron emission apparatus which may be of the type used in the flat panel display of FIG. 1.

Referring to FIG. 2, there is a highly magnified sketch in cross section of a thin-film implementation of cathode and gate electrodes, which may be of the type comprising the electron emission apparatus at the row and column intersections in the present invention. Electron emission apparatus 30 includes an electrically insulating substrate 12, illustratively glass, onto which there is a conductive layer 16, illustratively a metal such as molybdenum, which serves as a common conductor for all of the cathodes 40. A layer 34 of electrically insulating material is affixed to conductive layer 16, and a second thin conductive layer 14, which forms the gate electrode, overlays layer 34. A plurality of apertures 36 in layer 14 extend through insulating layer 34 down to conductive layer 16, thereby forming a plurality of wells 38 in apparatus 30. Cathodes 40, situated within each of these wells 38, comprise generally conical structures fabricated of a conductive material, illustratively a metal such as molybdenum, which are electrically interconnected via their contacts with conductive layer 16.

It will be easily understood by one with knowledge in the art how to fabricate apparatus 30 as shown in FIG. 2, for example, using well-known photolithographic processes. Briefly, in a preferred process, a layer of molybdenum is deposited on glass substrate 12 and etched to form the row (cathode) conductors 16, which are typically 0.75 micron in thickness. An oxide film 34, illustratively silicon dioxide ($SiO_2$) about 0.75 micron thick, is vacuum deposited over the metalized substrate 12 to serve as a spacer and electrical insulator between the row conductors 16 and column conductors 14.

A second layer of molybdenum is deposited onto insulating oxide film 34 and etched to form the column (gate) conductors 14, which are typically also 0.75 micron in thickness. During this second etching process, an array of holes 36, each approximately one micron in diameter, is also etched through the gate electrode layer 14, and through the insulating oxide layer 34, extending down to the cathode electrode layer 16. The reactive ion etching process typically employed to form holes 36 in the oxide layer 34 produces a slight undercutting beneath gate electrode layer 14, leaving the edges of apertures 36 slightly overhanging, as illustrated in FIG. 2.

Cathodes 40 are all formed simultaneously in wells 38, typically by vacuum evaporation of molybdenum in a direction perpendicular to substrate 12. Prior to, and during this evaporation, chemically removable materials, such as aluminum, are vacuum deposited at near-grazing incidence while substrate 12 is rotated about an axis along the direction of molybdenum deposition, gradually closing holes 36 in gate electrodes 14 through which the evaporated molybdenum passes, to form a parting layer of decreasing diameter, eventually resulting in cone-shaped, field-emitters 40 with the tips approximately in the plane of the top surface of gate electrodes 14. In the final step of fabrication of electron emission apparatus 30, the material of the aluminum parting layer is dissolved and removed from around and within holes 36 and wells 38.

Ideally, the cone shape and dimensions are very nearly identical among all cathodes 40, with the two radius being about 30–40 nanometers. However, the physical limitations of the manufacturing process, as described earlier, preclude such uniformity. The process step illustrated, in exaggerated scale, by FIG. 3, results in variations in the shapes and dimensions of the cones 40 over the extent of emitting structure 30.

Figure 3:
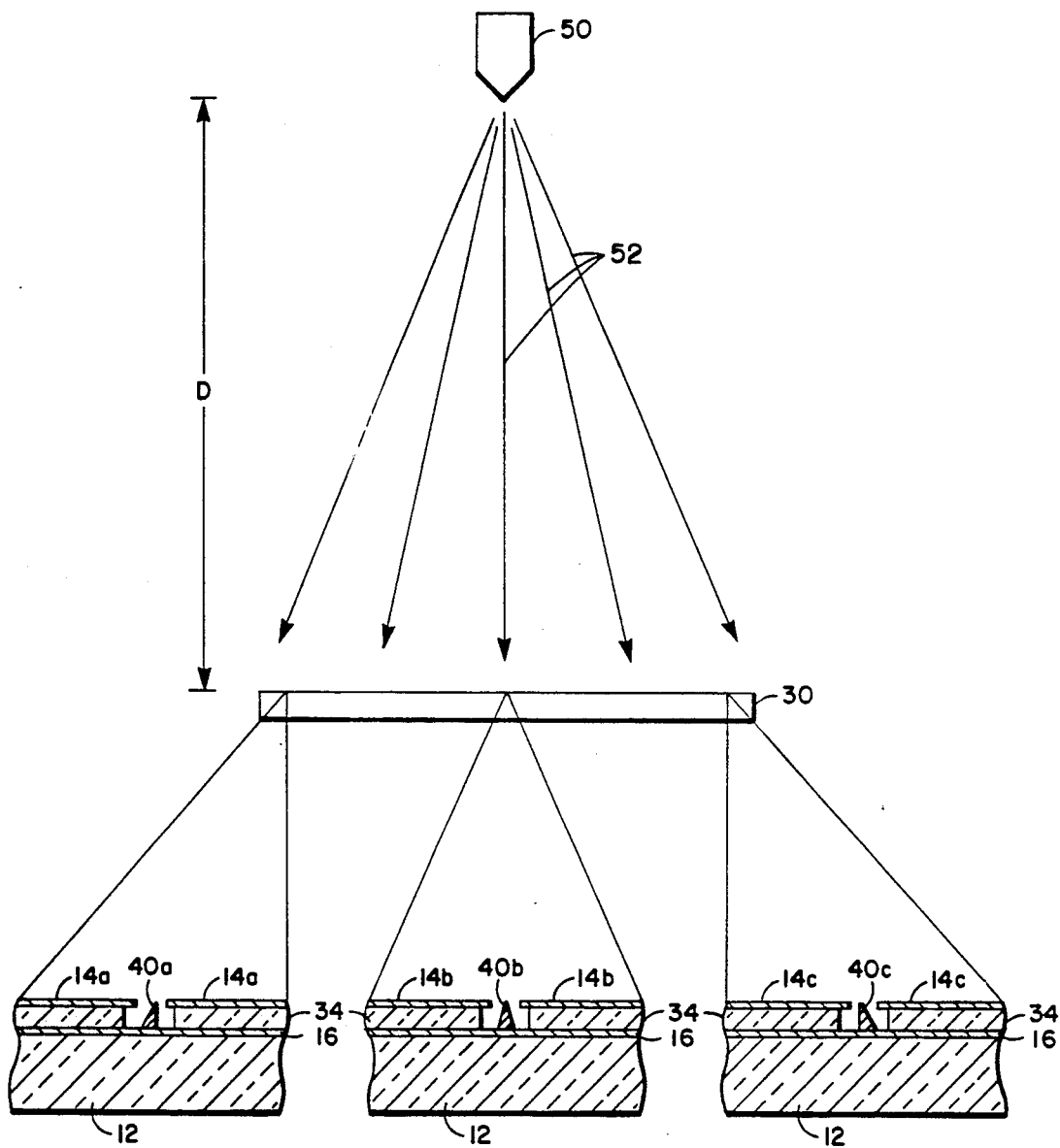
FIG. 3 depicts a step in the process of fabricating the emitters of FIG. 2 illustrating how this process may give rise to irregularities in the tips.

FIG. 3 illustrates the molybdenum evaporation process step in which the cone-shaped cathodes 40 are formed on emitting structure 30. (For ease of depiction, the apparatus for providing simultaneous evaporation of the parting layer material is omitted.) A source 50 of evaporated molybdenum directs vapor beams 52 onto structure 30, typically from a distance of 90–150 cm. Because of the different angles of incidence of beams 52 on the facing surface of structure 30, cones 40 assume different shapes across the extent of structure 30.

Three portions of structure 30 are shown in magnified views in FIG. 3: a left portion, a central portion and a right portion. The left portion illustrates an eccentric cone 40a, whose tip is skewed toward the right-hand edge of the aperture in gate electrode 14a. The central portion illustrates a symmetrical cone 40b, whose tip is generally centrally located within the aperture of gate electrode 14b. The right portion illustrates an eccentric cone 40c, whose tip is skewed toward the left-hand edge of the aperture in gate electrode 14c.

Figure 4:
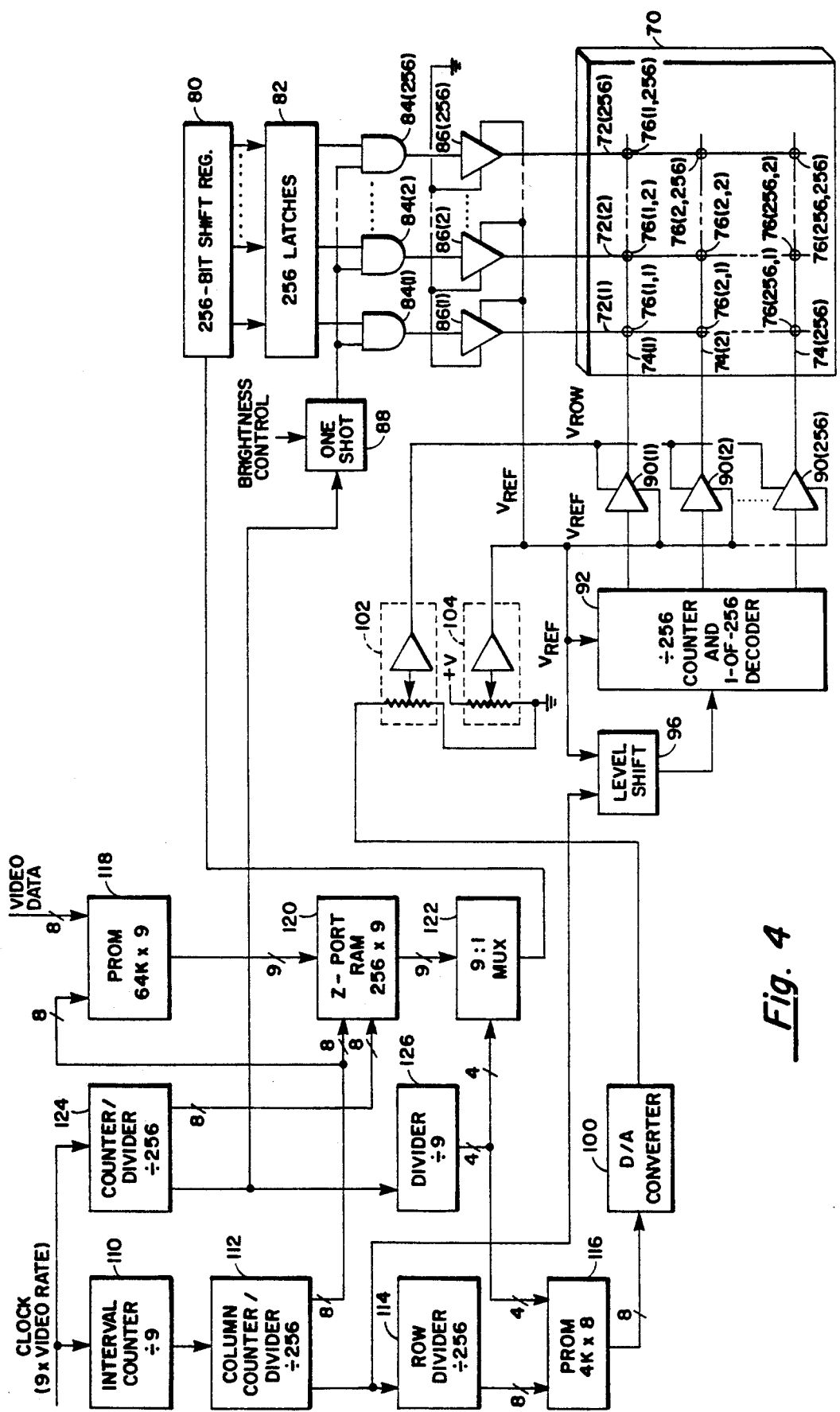
FIG. 4 is a block diagram of a first embodiment of a brightness control circuit including means for compensating emitter irregularities in accordance with the principles of the present invention.

Referring to FIG. 4, there is shown an apparatus for controlling the brightness of a matrix-addressed flat panel CRT display of the type shown in FIGS. 1 and 2, and described in earlier paragraphs. The brightness control is effected by controlling both the duty cycle and the voltage applied to intersecting column and row drive lines. A waveform having progressively increasing voltage steps is applied to a selected conductor in one axis. The voltages at each of the steps are preferably selected to enable electron beam current which provide brightness levels which are twice the brightness of the previous step. Binary-coded brightness control signals are simultaneously applied to all of the conductors in the other axis. In accordance with the principles of the present invention, the voltages of the stepped waveform and the binary-coded signals comprise a combination of video information data and correction data which compensate for irregularities in the emitting structure at the selected conductors. The combined voltages at the intersections of these selected conductors cause a sequence of electron emissions which result in a corresponding sequence of illumination intervals. The human optic system integrates this illumination sequence into the selected brightness level. In addition, the overall brightness of the display is controlled by gating the waveform on the conductor at either axis with a pulse train comprising a sequence of adjustable, uniform width pulses.

Considering the brightness-controlling apparatus of FIG. 4 in greater detail, flat panel display 70 is shown having a multiplicity of column drive lines 72(1), 72(2), ..., 72(256), referred to collectively as column drive lines 72, and a multiplicity of row drive lines 74(1), 74(2), ..., 74(256), referred to collectively as row drive lines 74. The intersections of column drive lines 72 and row drive lines 74 occur at field electron emitters 76(1,1), 76(1,2), ..., 76(1,256), 76(2,1), 76(2,2), ..., 76(2,256), ..., 76(256,1), 76(256,2), ..., 76(256,256), referred to collectively as field electron emitters 76.

For the purpose of ease of illustration as well as understanding, it will be assumed that in this example the display panel 70 is a monochrome display having a 256×256 display matrix. Thus, the disclosed embodiment will include 256 column drive lines 72 and 256 row drive lines 74. Nevertheless, it will be recognized that the principles taught herein are equally applicable to color displays, as well as to any size matrix, including the 640×400 VGA standard, or larger.

It will further be assumed that the video graphics system (not shown) which supplies the video drive signals to the brightness control apparatus of the present invention provides an 8-bit word of brightness data, referred to as VIDEO DATA, for each pixel of the display, thereby enabling $2^8 = 256$ levels of display brightness at each pixel position.

The brightness control apparatus illustrated in FIG. 4 includes a 256-bit shift register 80 whose output signals are coupled to latch circuit 82. The 256 latched output signals are individually coupled to a first input terminal of AND gates 84(1), 84(2), ..., 84(256), referred to collectively as AND gates 84. The AND gates 84 are individually coupled to drivers 86(1), 86(2), ..., 86(256), referred to collectively as drivers 86. In the present example, drivers 86 are preferably of the totem-pole type, responsive to logic level input signals by applying one or the other of their two rail voltages to their output terminals. In the present example, the rail voltages on drivers 86 are zero volts and a reference voltage, $V_{REF}$, typically about 30 volts. Each driver 86(i) drives a corresponding column drive line 72(i) of panel display 70. An adjustable one shot circuit 88 drives the second input terminal of all AND gates 84, providing one adjustable-width gating pulse for each set of data clocked into latches 82. The widths of the pulses output from one shot circuit 88 are adjusted via the control designated BRIGHTNESS ADJUST.

The row drive lines 74 of panel display 70 are individually driven by totem-pole drivers 90(1), 90(2), ..., 90(256), referred to collectively as drivers 90. Drivers 90 are responsive to the logic level voltages applied at their input terminals from counter/decoder 92 for applying one or the other of their rail voltages to row drive lines 74. In the present example, the rail voltages coupled to drivers 90 are $V_{REF}$ and a voltage waveform $V_{ROW}$.

Figure 5:
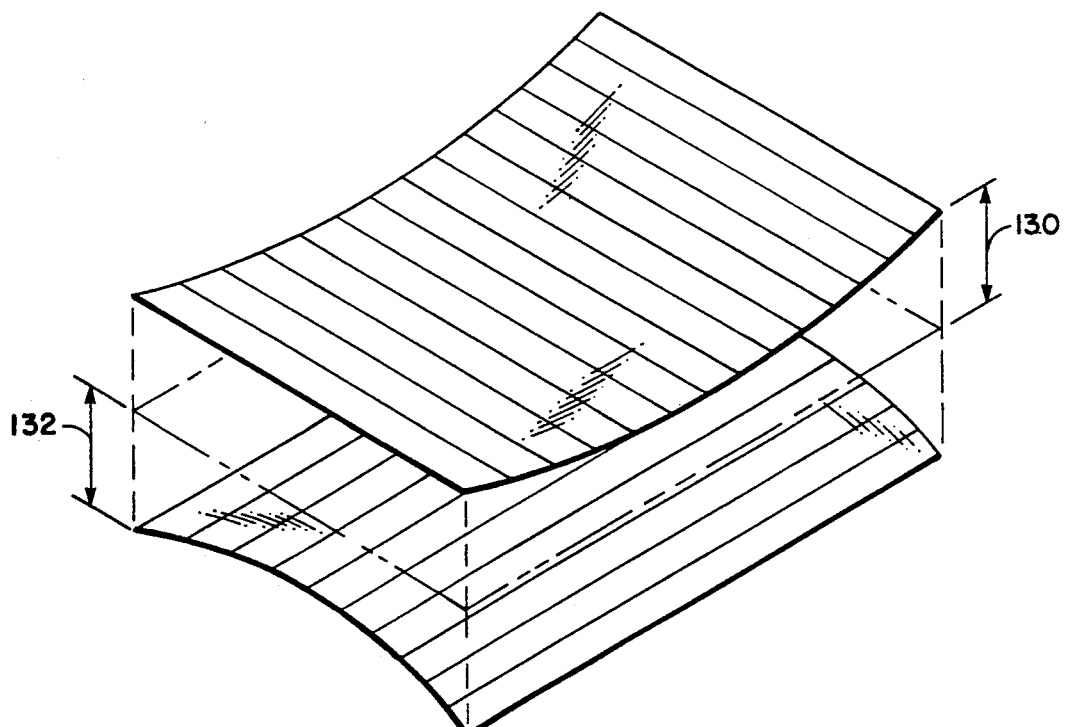
FIG. 5 illustrates correction factors which may be applied to the row and column conductors of the display of FIG. 1.

In the preferred embodiment, $V_{ROW}$ comprises a staircase waveform of generally increasing voltages having, in this example, nine voltage levels, referred to as $V_0, V_1, V_2, \ldots, V_8$. The values of $V_0$ through $V_8$ are specific to each of the illustratively 256 rows. Successive levels of $V_i$ are generated substantially in synchronism with the latching of data from shift register 80 into latches 82. FIG. 5 is a graphical representation depicting the range of row corrections across the face of a typical display panel which may be provided by the data words stored in PROM 116.

Referring again to FIG. 4, counter/decoder 92 is responsive to a succession of voltage transitions at its input terminal by sequentially enabling its output terminals. In the practice of this circuit, counter/decoder 92 and drivers 90 operate such that the row voltage waveforms are coupled individually to the appropriate one of the row drive lines 74(j) while the unselected row drive lines remain at $V_{REF}$.

A timing signal, designated CLOCK in FIG. 4, corresponds in frequency to nine times the rate at which VIDEO DATA is provided. The CLOCK signal is coupled to an interval counter 110, which provides an output signal having a single clocking edge after every ninth occurrence of the CLOCK signal. The CLOCK signal is also coupled to counter/divider 124, which performs binary division on the CLOCK signal by the number of columns on display panel 70, 256 in the present example. Counter/divide 124 additionally functions as a counter, providing an output signal having a single clocking edge after every 256th occurrence of the CLOCK signal.

The output signal from counter 110 is coupled as the clock input to column counter/divider 112, which performs binary division on its clock input signal by the number of column lines. Counter/divider 112 additionally functions as a counter, providing an output signal having a single clocking edge after every 256th occurrence of its input clocking signal.

The eight binary divider outputs from column counter/divider 112 are coupled as addressing inputs to PROM 118 and to the read-mode addressing inputs of two-port RAM 120. The counter signal output from counter/divider 112 is coupled as the clocking input to row divider 114 and, through level shifter 96, to counter/decoder 92. Row divider 114 performs binary division on its clock input signal by the number of row lines, 256 in the present example. The eight binary divider outputs of row divider 114 are coupled as addressing bits to PROM 116.

The eight binary divider outputs of counter/divider 124 are coupled to the write-mode addressing inputs of two-port RAM 120. The counter signal output from counter/divider 124 is coupled as the clock input to divider 126, which performs binary division on its clock input signal by the number of bits of brightness control data for each display pixel nine in the present example. The four binary divider outputs of interval counter/divider 110 are coupled as addressing inputs to PROM 116 and as select inputs to multiplexer 122. The counter signal output from counter/divider 124 is also coupled as the trigger signal to one shot circuit 88. One shot circuit 88 provides gating pulses to AND gates 84, which pulses are adjustable in length by the BRIGHTNESS CONTROL signal.

In the embodiment of FIG. 4, PROM 116 stores 8-bit representations of the analog voltage levels for each of the nine intervals within a display period, for each of the 256 rows of display panel 70. For the illustrative configuration of PROM 116 depicted in FIG. 7 and described in the accompanying text, the four binary divider outputs from divider 126 are applied as the four least significant addressing bits to PROM 116, and the eight binary divider outputs from row divider 114 are applied as the eight most significant addressing bits. The eight data output lines from PROM 116 are applied to digital-to-analog (D/A) converter 100 which produces, at its output terminal, voltage levels corresponding to the 8-bit digital words received from PROM 116.

The output signal from D/A converter 100 is coupled to adjustable voltage driver 102 whose output provides the $V_{ROW}$ signal to one rail of row drivers 90. A similar adjustable voltage driver 104, coupled to a voltage source, provides the $V_{REF}$ voltage to rails on both column drivers 86 and row drivers 90. Voltage drivers 102 and 104 are adjustable in order to properly select and maintain values of $V_{ROW}$ and $V_{REF}$, for the purpose of providing the desired levels of electron beam current.

The eight binary divider outputs from column counter/divider 112 are coupled as addressing inputs to PROM 118. The eight signal lines of a typical 8-bit VIDEO DATA signal are also coupled as addressing inputs to PROM 118. For the illustrative configuration of PROM 118 depicted in FIG. 8 and described in the accompanying text, the eight binary divider outputs from counter/divider 112 are applied as the eight most significant addressing bits to PROM 118, and the eight VIDEO DATA signal lines are applied as the eight least significant addressing bits.

In accordance with the principles of the present invention, PROM 118 contains 9-bit, video data words which provide individual correction of the 8-bit, input VIDEO DATA for each of the 256 columns in the disclosed embodiment. FIG. 5 is a graphical representation depicting the range of column corrections across the face of a typical display panel which may be provided by correction factors in the 9-bit video data words stored in PROM 118. Referring again to FIG. 4, the nine data output lines from PROM 118 are applied to two-port RAM 120, which stores 256 words of nine bits each.

The preferred embodiment of the present invention relates to a system in which all of the pixels of a row are simultaneously energized. As such, it is a requirement that shift register 80 be loaded with corresponding bits of all brightness data words of an entire row, i.e., all bit 0's of the 256 pixels of row 74(j), followed by all bit 1's of the 256 pixels of row 74(j), ..., followed by all bit 8's of the 256 pixels of row 74(j), followed by all bit 0's of the 256 pixels of row 74(j+1), etc. In furtherance thereof, RAM 120 writes the 9-bit, video data word accessed from PROM 118 by the simultaneous addressing from column counter/divider 112. Contemporaneously, counter/divider 124 cycles through its 256 addressing states, sequentially reading the 256 9-bit video data words, corresponding to the 256 columns, into 9-to-1 multiplexer 122. Divider 126 sequences the select inputs to multiplexer 122, thereby steering a single bit position from each of the 256 columns, followed by the next bit position from each of the 256 columns, etc., to the serial data input of shift register 80.

In the preceding discussions, the circuitry associated with the column drive lines 72, viz., shift register 80, latches 82, AND gates 84 and drivers 86, and the circuitry associated with the row drive lines 74, viz., counter/decoder 92 and drivers 90, have been described with regard to their functions. However, it will be recognized by those knowledgeable in the area of video displays, that the described functions of each of the column and row circuits in n-bit slices may be included in a single device. Such a device is, by way of illustration, Model HV53/HV54, sold by Supertex, Inc., of Sunnyvale, Calif.

It will be realized, however, that when a device such as that described in the preceding paragraph is used for the row drive circuitry of the present invention, wherein the reference potential ($V_{REF}$) is significantly different from the reference potential (0 volts) of the rest of the circuitry, a voltage level shifting circuit 96 is required to interface between the two voltage systems.

Figure 6:
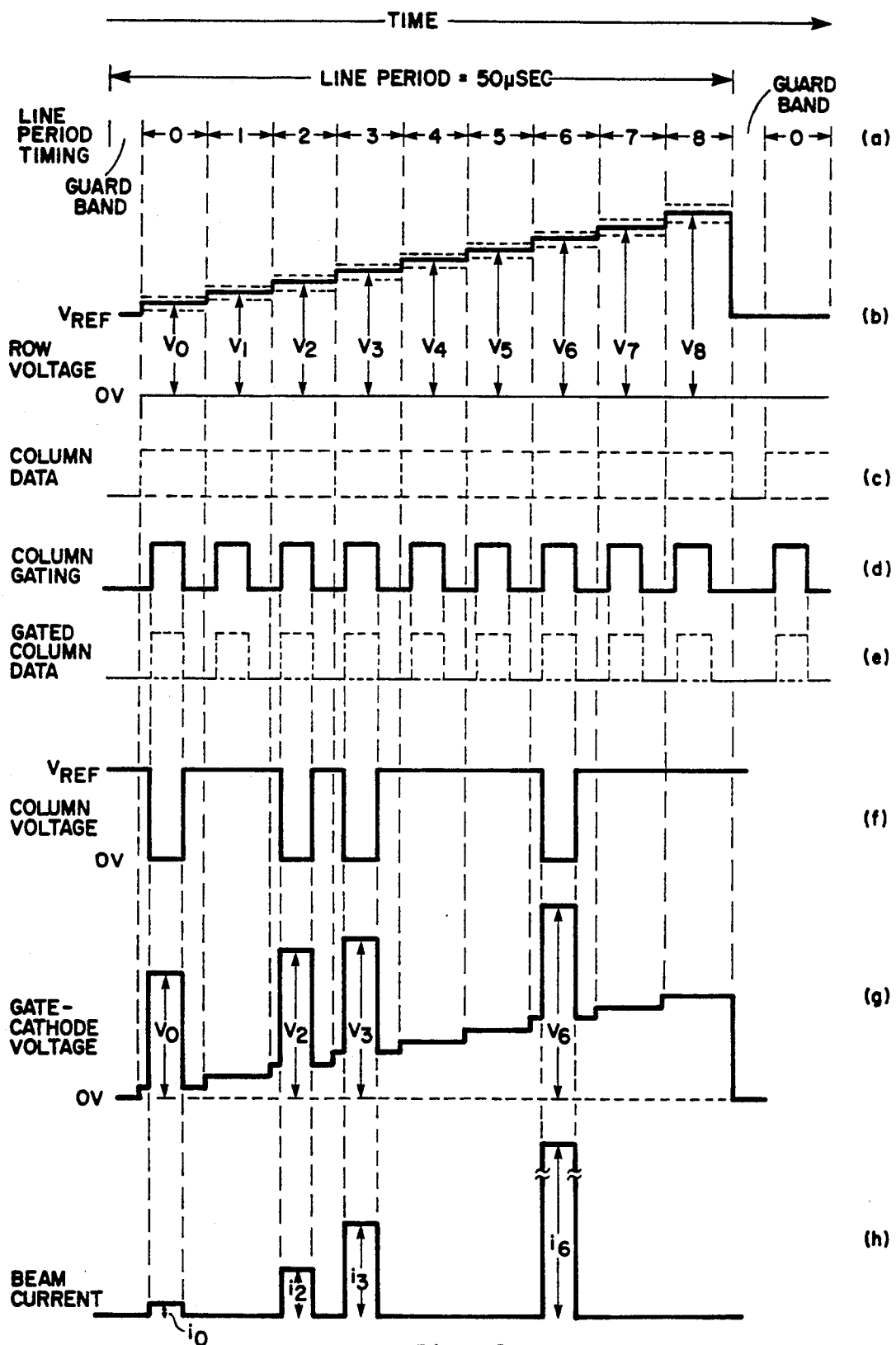
FIG. 6 is a set of timing diagrams useful in understanding the operation of the brightness control circuit of FIG. 4.

Referring to FIG. 6, there is shown an illustrative example comprising a series of plots, related on the time axis, which are useful in understanding the operation of the brightness control circuit of the present invention. Plot (a) illustrates a line period of 50 $\mu$sec., which is divided into nine equal segments of 5.33 $\mu$sec. each, and a guard band of 2 $\mu$sec. The nine segments of the line period are denoted segment 0, segment 1, ..., segment 8, corresponding to the nine bits of brightness control data for each display pixel.

Plot (b) of FIG. 6 illustrates an exemplary voltage waveform which is applied to one of the row conductors. As is seen, the row conductors normally reside at a voltage $V_{REF}$; when the line period of the particular row of interest is reached, a waveform typified by plot (b) is applied to the row conductor, stepping incrementally from a value for $V_0$ within a range of values, to a value for $V_8$ within a range of values, during the corresponding segments of the line period. Each step of the waveform can take on a value within the range shown between the dashed lines of plot (b), the range representing the extent of correction of emitter current required to satisfy the irregularities of display panel 70.

Plot (c) of FIG. 6 shows the timing of the nine bits of brightness data as appear serially at the nth output line of latch circuit 82 and applied as the column data at one input terminal of AND gate 84(i). Plot (d) illustrates the column gating signal, as may be generated by one shot circuit 88, and applied to the other input terminal of AND gate 84(i), for the purpose of providing overall brightness adjustment to the display, and for reducing switching transients. Plot (e) illustrates the timing of the output signal from AND gate 84(i).

Plots (f), (g) and (h) of FIG. 6 illustrate a particular example of brightness control data applied to one of the column conductors 72(i) via latch circuit 82, AND gates 84 and column drivers 86. In this example, the brightness control data has been arbitrarily selected as: 001001101, a shorthand representation for bit 0 =1, bit 1 =0, bit 2 =1, bit 3 =1, bit 4 =0, bit 5 =0, bit 6 =1, bit 7 = 0 and bit 8 = 0. As a result, the waveform of plot (f) is generated by the column driver 86 onto column conductor 72(i), wherein the voltage is driven down to 0 volts from $V_{REF}$ only during the gated periods of selected bits (bit = 1). Column conductor 72(i) intersects a selected row conductor 74(j) having a voltage waveform as shown in plot (b) of FIG. 6. Since column conductor 72(i) includes the cathode electrode of the electro emitter at pixel 76(i,j), and row conductor 74(j) includes the gate electrode of the electron emitter at pixel 76(i,j), then the gate-cathode voltage waveform at the selected intersection will be shown in plot (g). Voltages $V_0$ through $V_7$ are selected to provide electron beam currents related according to a binary progression which has been corrected for the particular row conductor 74(j) being addressed. Thus, the beam current waveform illustrated in plot (h) of FIG. 6 will be generated in response to the brightness control data of this example, i.e., individual pulses of $2^0=1$, $2^2=4$, $2^3=8$ and $2^6=64$ units of current.

It will be observed from the waveform of plot (g) that for each time segment t of a line period for which the brightness control data bit is zero, i.e., bit t = 0, there is a measurable gate-cathode voltage, ranging from a minimum value of $(V_0-V_{REF})$ for bit 0 to a maximum value of $(V_8-V_{REF})$ for bit 8. Nevertheless, the maximum value of gate-cathode voltage for a brightness control data bit of zero, $(V_8-V_{REF})$ at time segment 8, is still sufficiently below the minimum value of gate-cathode voltage for a brightness control data bit of one, $V_0$ at time segment 0, that the beam current emitted as a result is insignificant when compared to $i_0$.

Figures 7, 8:
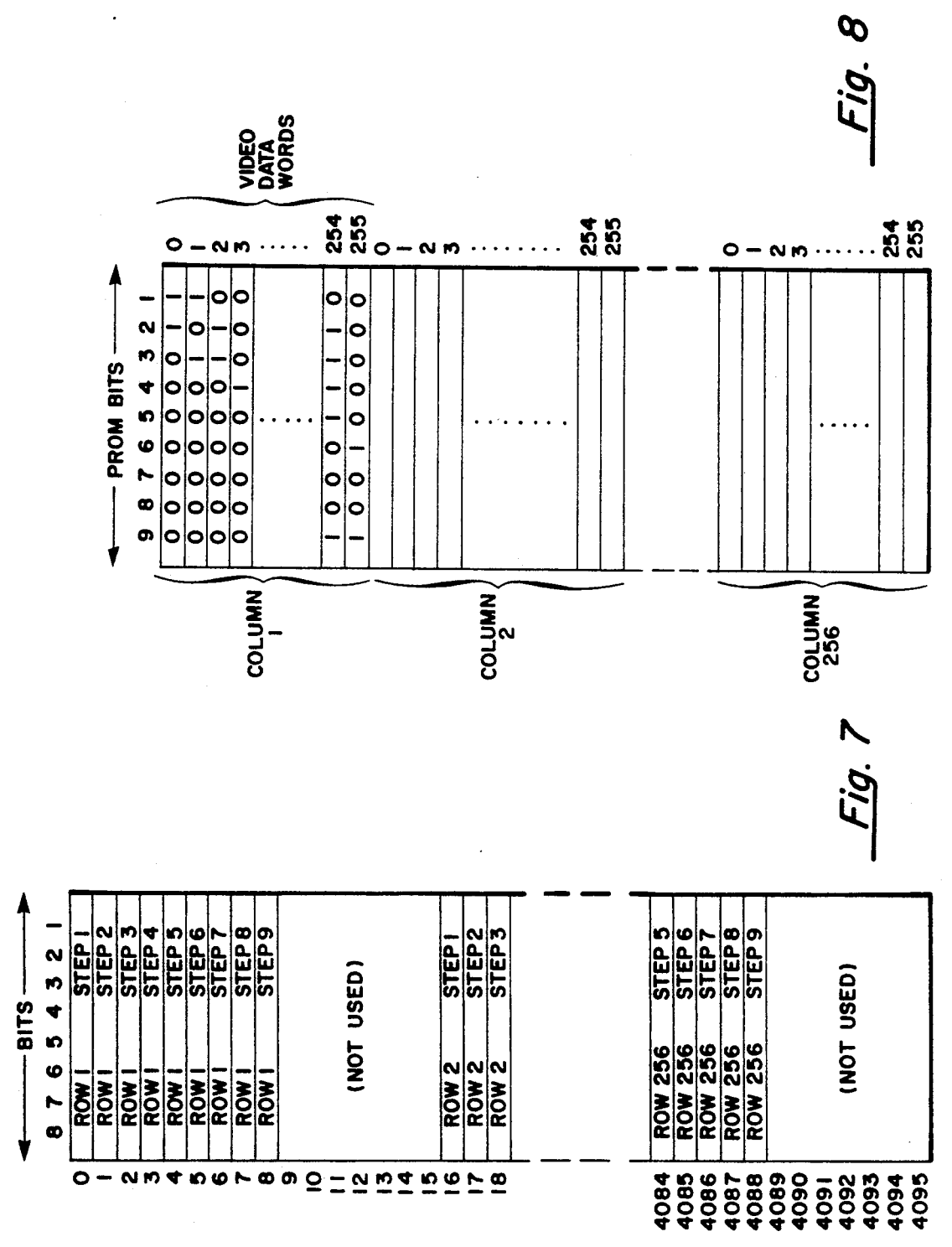

Referring now to FIG. 7, there is shown an illustrative logical organization of PROM 116 of the FIG. 4 embodiment. As described in relation to FIG. 4, PROM 116 is configured as a 4K×8 device (4,096 words of 8 bits each), containing 8-bit digital representations of the analog voltages to be applied to the individual row conductors 74(i). More particularly, PROM 116, as represented by FIG. 7, contains nine digital words, representing the voltage levels of the nine intervals of each video data word, for each of the 256 row conductors 74. Because of the convenience of a digital addressing scheme, seven memory words following each set of nine digital representations of analog voltages are not used.

It will be easily recognized by those skilled in the art that the nine intervals of each video data word may be increased to as many as sixteen intervals, at no additional cost to PROM 116, simply by using the memory locations which are unused by this illustrative example. In addition, it will also be recognized that finer control of the row voltages may be provided by increasing the word size of PROM 116 beyond the eight bits presently illustrated, necessitating also a corresponding change in the number of digital inputs to be processed in D/A converter 100. Either such increase would enable finer degrees of brightness correction.

Referring now to FIG. 8, there is shown an illustrative logical organization of PROM 118 of the FIG. 4 embodiment. As described in relation to FIG. 4, PROM 118 is configured as a 64K×9 device (65,536 words of 9 bits each), containing 9-bit words used to convey brightness data to the individual column conductors 72(i). More particularly, PROM 118, as represented by FIG. 8, contains, for each of the 256 column conductors 72, 256 9-bit, digital words, representing the corrected digital values of the corresponding 256 levels of 8-bit, video input data.

In the illustration of FIG. 8, for the pixels of column 1, an 8-bit, video input data word of 0 (binary: 00000000) corresponds to a 9-bit, corrected video data word of 3 (binary: 000000011); an 8-bit, video input data word of 1 (binary: 00000001) corresponds to a 9-bit, corrected video data word of 5 (binary: 000000101); an 8-bit, video input data word of 2 (binary: 00000010) corresponds to a 9-bit, corrected video data word of 6 (binary: 000000110); an 8-bit, video input data word of 3 (binary: 00000011) corresponds to a 9-bit, corrected video data word of 8 (binary: 000001000); . . . an 8-bit, video input data word of 254 (binary: 11111110) corresponds to a 9bit, corrected video data word of 286 (binary: 100011110); and an 8-bit, video input data word of 255 (binary: 11111111) corresponds to a 9-bit, corrected video data word of 288 (binary: 100100000). Although not explicity illustrated, it would be expected that the corrections for the 256 8-bit, video input data words may be different for each of the 256 column conductors 72.

It will be recognized by those skilled in the art that if there is to be a further increase in the sensitivity of the corrected digital value of each video input word, the length of each of the 64K words of PROM 118 must be increased from the illustrative nine in the present example, and the number of intervals of each video data word must be correspondingly increased. Such an increase would enable finer degrees of brightness correction.

Figure 9:
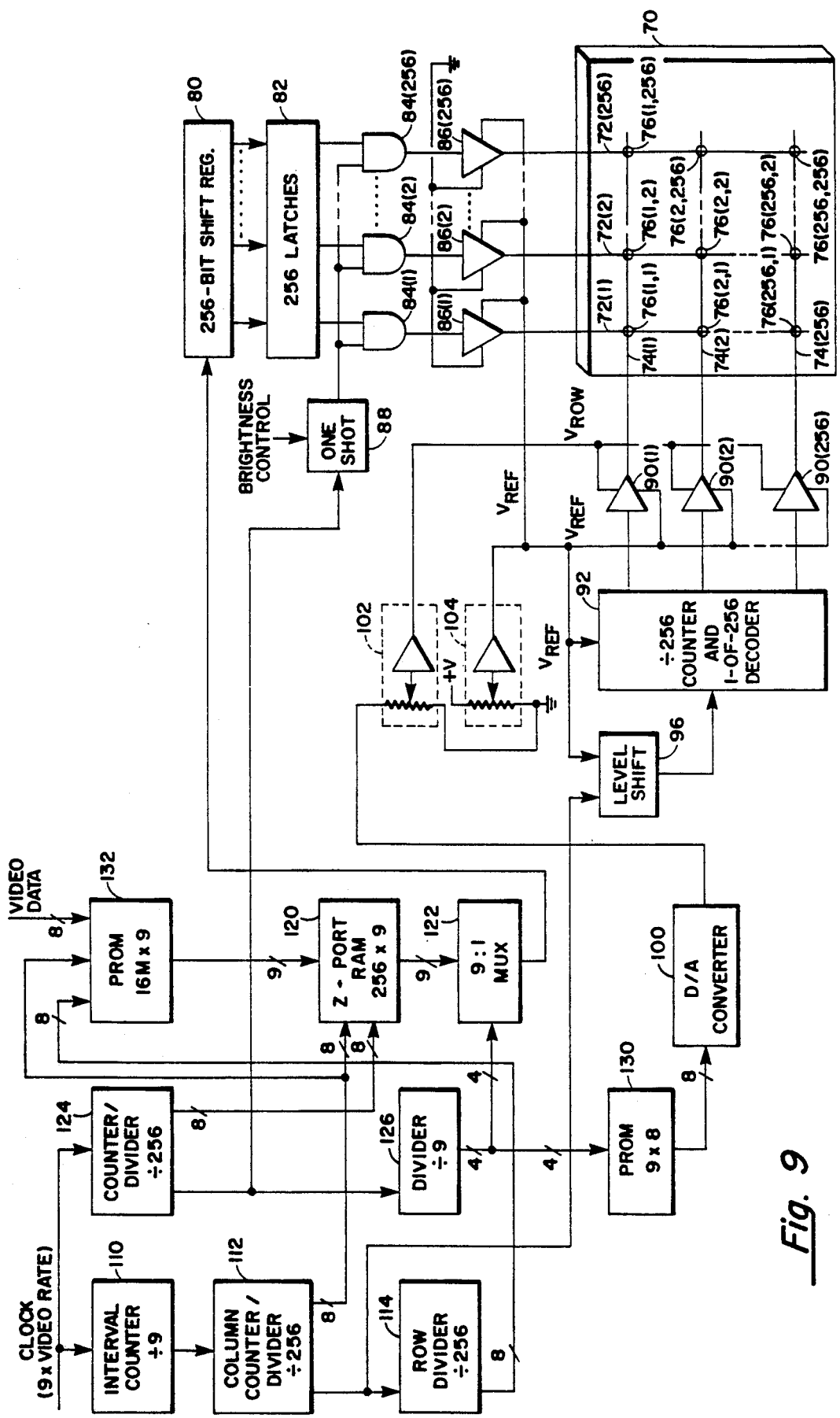
FIG. 9 is a block diagram of a second embodiment of a brightness control circuit including means for compensating emitter irregularities in accordance with the principles of the present invention.

Referring now to FIG. 9, there is shown a block diagram of a second embodiment of a brightness control circuit including means for compensating emitter irregularities, in accordance with the principles of the present invention. The embodiment of FIG. 9 differs from that of FIG. 4 in that it enables independent emitter brightness compensation at every individual pixel. The cost of this enhanced capability is a significantly larger PROM containing the 9-bit words used to convey brightness data to the individual column conductors 72(i). Much of the structure of the FIG. 9 embodiment is identical to corresponding elements of the FIG. 4 embodiment; these identical elements have been given the same reference numeral designators.

A CLOCK signal, having the same frequency as the corresponding signal in the embodiment of FIG. 4, is coupled to an interval counter 110, which provides an output signal having a single clocking edge after every ninth occurrence of the CLOCK signal. The CLOCK signal is also coupled to counter/divider 124, which performs binary division on the CLOCK signal by the number of columns on display panel 70, 256 in the present example. Counter/divider 124 additionally functions as a counter, providing an output signal having a single clocking edge after every 256th occurrence of the CLOCK signal.

The eight binary divider outputs of counter/divider 124 are coupled to the read-mode addressing inputs of two-port RAM 120. The counter signal output from counter/divider 124 is coupled as the clock input to divider 126, which performs binary division on its clock input signal by the number of bits of brightness control data for each display pixel nine in the present example. The four binary divider outputs of interval counter/divider 110 are coupled as addressing inputs to PROM 130 and as select inputs to multiplexer 122. The counter signal output from counter/divider 124 is also coupled as the trigger signal to one shot circuit 88. One shot circuit 88 provides gating pulses to AND gates 84, which pulses ar adjustable in length by the BRIGHTNESS CONTROL signal.

Since the embodiment of FIG. 9 provides compensation for emitter irregularities at every individual pixel, such compensation may be stored within a single memory device, in this case it is PROM 132, corresponding to the column drive lines 72, permitting PROM 103, corresponding to the row drive lines 74, to provide but a single waveform to all of the 256 rows. As such, PROM 130 illustratively includes nine stored words which are digital representations of nine predetermined voltage levels. In this example, each of these memory words is eight bits in length, providing sufficient precision for the applications of the present invention. These eight data bits from PROM 130 ar applied to digital-to-analog (D/A) converter 100 which produces, at its output terminal, the corresponding predetermined voltage levels.

The output signal from counter 110 is coupled as the clock input to column counter/divider 112, which performs binary division on its clock input signal by the number of column lines, 256 in the present example. Counter/divider 112 additionally functions as a counter, providing an output signal having a single clocking edge after every 256th occurrence of its input clocking signal.

The eight binary divider outputs from column counter/divider 112 are coupled as addressing inputs to PROM 132 and to the write-mode addressing inputs of two-port RAM 120. The counter signal output from counter/divider 112 is coupled as the clocking input to row divider 114 and, through level shifter 96, to counter/decoder 92. Row divider 114 performs binary division on its clock input signal by the number of row lines, 256 in the present example. The eight binary divider outputs of row divider 114 are coupled as addressing bits to PROM 132.

Finally, the eight signal lines of a typical 8-bit VIDEO DATA signal are also coupled as addressing inputs to PROM 132. For the illustrative configuration of PROM 132 depicted in FIG. 10 and described in the accompanying text, the eight binary outputs from row divider 114 are applied as the eight most significant addressing bits to PROM 132, the eight binary divider outputs from column counter/divider 112 are the middle addressing bits, and the eight VIDEO DATA signal lines are applied as the eight least significant addressing bits.

In accordance with the principles of the present invention, PROM 132 contains 9-bit, video data words which provide individual correction of the 8-bit, input VIDEO DATA for each of the 65,536 pixels in the disclosed embodiment. Referring again to FIG. 4, the nine data output lines from PROM 132 are applied to two-port RAM 120. RAM 120 writes the 9-bit, video data word accessed from PROM 132 by the simultaneous addressing from column counter/divider 112. Contemporaneously, counter/divider 124 cycles through its 256 addressing states, sequentially reading the 256 9-bit video data words, corresponding to the 256 columns, into 9-to-1 multiplexer 122. Divider 126 sequences the select inputs to multiplexer 122, thereby steering a single bit position from each of the 256 columns, followed by the next bit position from each of the 256 columns, etc., to the serial data input of shift register 80.

Figure 10:
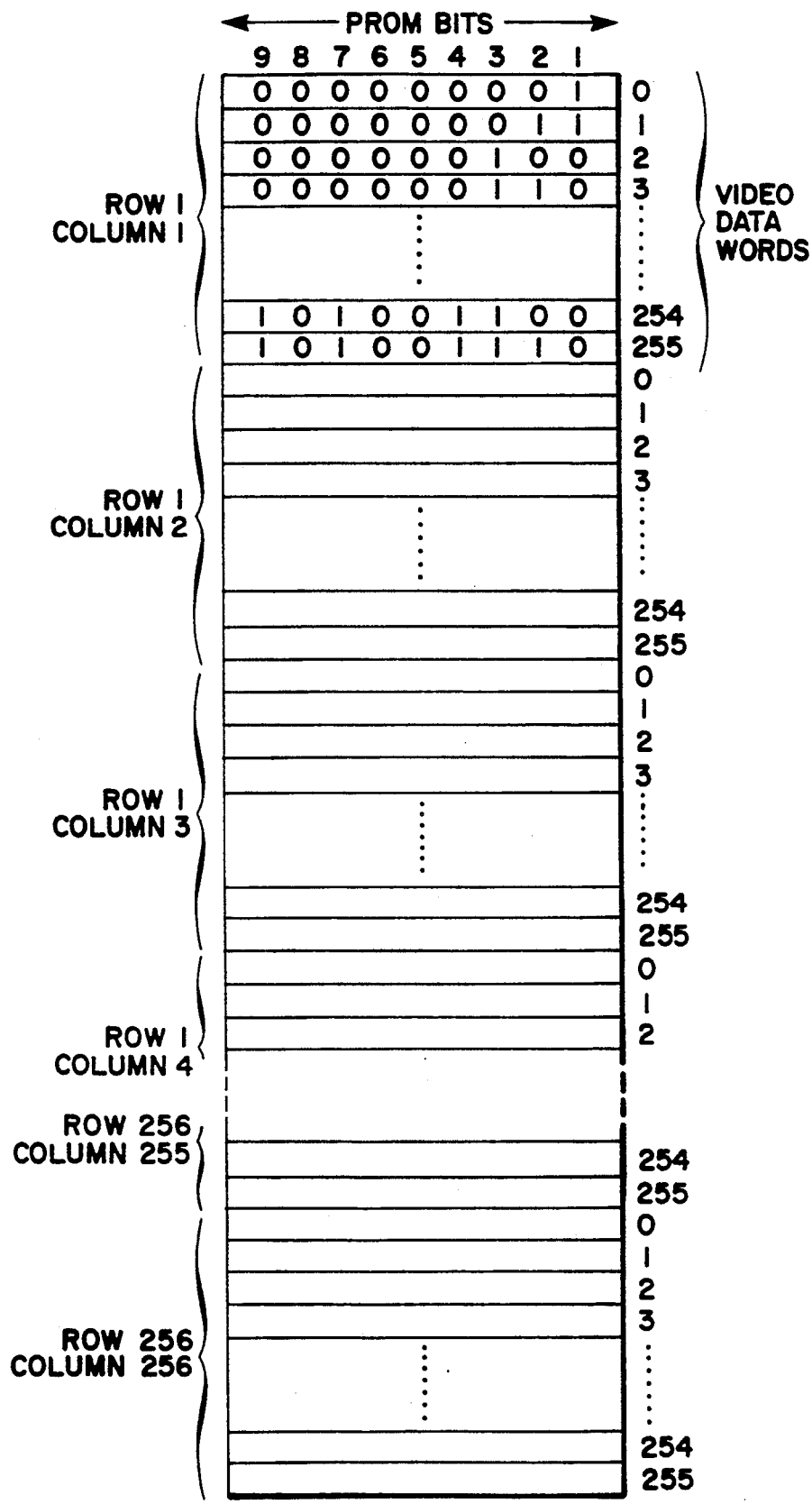
FIG. 10 illustrates an illustrative logical organization of a PROM used to control column conductor brightness data in the embodiment of FIG. 9.

Referring now to FIG. 10, there is shown an illustrative logical organization of PROM 132 of the FIG. 9 embodiment. As described in relation to FIG. 9, PROM 132 is configured as a 16M×9 device (16,777,216 words of 9 bits each), containing 9-bit words used to convey individual brightness data to each of the pixels on the display 70. More particularly, PROM 132, as represented by FIG. 10, contains, for each of the 65,536 pixels (256 rows by 256 columns), 256 9-bit, digital words, representing the corrected digital values of the corresponding 256 levels of 8-bit, video input data.

In the illustration of FIG. 10, for the pixel at the intersection of row 1 with column 1, an 8-bit, video input data word of 0 (binary: 00000000) corresponds to a 9-bit, corrected video data word of 1 (binary: 000000001); an 8-bit, video input data word of 1 (binary: 00000001) corresponds to a 9-bit, corrected video data word of 3 (binary: 000000011); an 8-bit, video input data word of 2 (binary: 00000010) corresponds to a 9-bit, corrected video data word of 4 (binary: 000000100); an 8-bit, video input data word of 3 (binary: 00000011) corresponds to a 9-bit, corrected video data word of 6 (binary: 000000110); ... an 8-bit, video input data word of 254 (binary: 11111110) corresponds to a 9-bit, corrected video data word of 332 (binary: 101001100); and an 8-bit, video input data word of 255 (binary: 11111111) corresponds to a 9-bit, corrected video data word of 334 (binary: 101001110). Although not explicitly illustrated, it would be expected that the corrections for the 256 8-bit, video input data words may be different for each of the 65,536 pixels of the illustrative display panel 70.

It will be recognized by those skilled in the art that if there is to be an increase in the sensitivity of the corrected digital value of each video input word, the length of each of the 16M words of PROM 132 must be increased from the illustrative nine in the present example, and the number of intervals of each video data word must be correspondingly increased. Such an increase would enable finer degrees of brightness correction.

Having described an apparatus and method for correcting unwanted variations in brightnesses of the individual pixels of a matrix-addressed, flat panel display by appropriately varying the control voltage, wherein the corrections to the control voltage ar provided by digital-to-analog circuits responsive to PROM-stored data, it remains to describe how such correction data are obtained.

Figure 11:
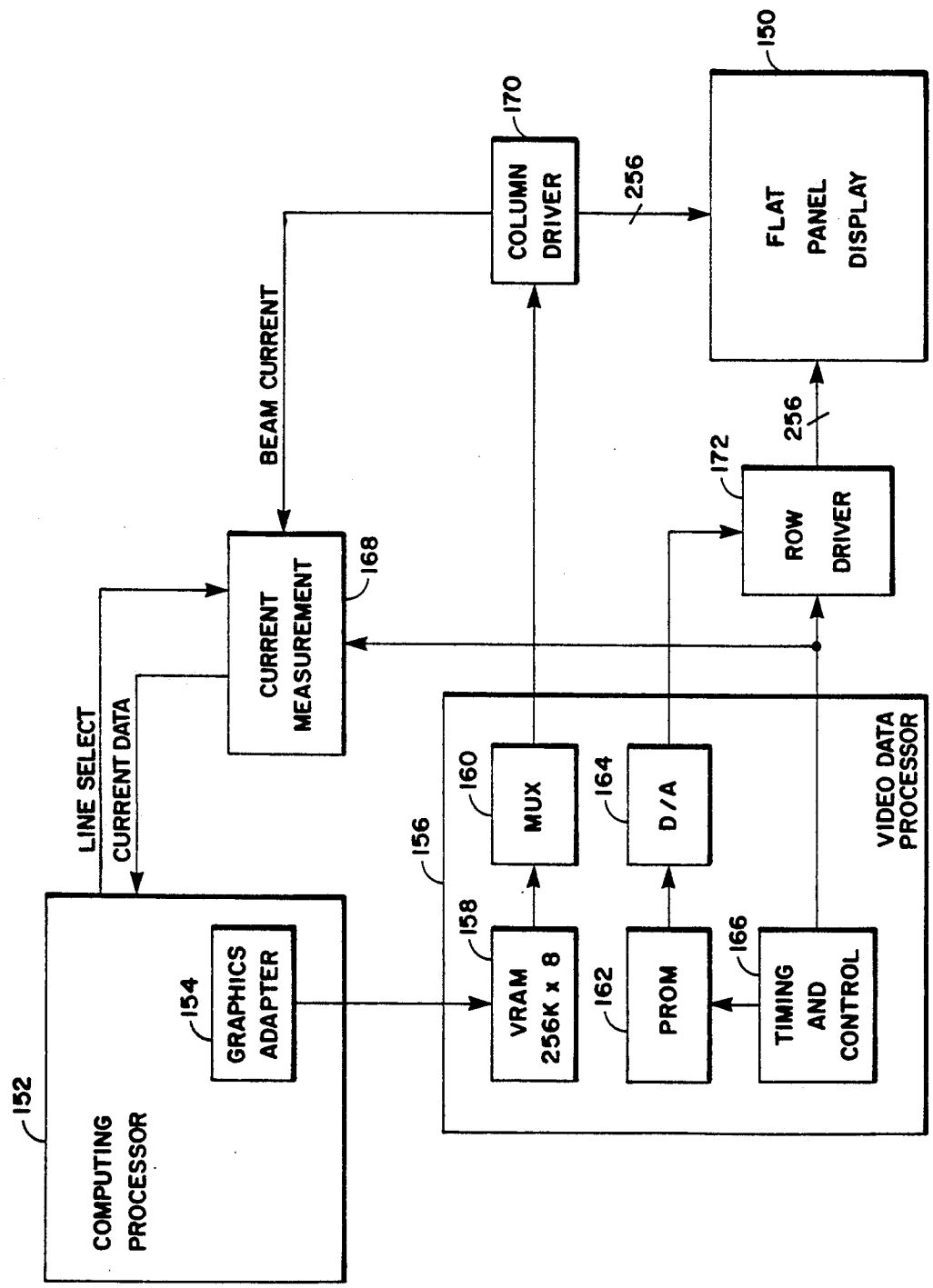
FIG. 11 is a block diagram of an illustrative circuit for determining the brightness corrections required at the individual pixels of the display of FIG. 1.

Referring to FIG. 11, there is shown an illustrative test setup which may be used to determine the brightnesses of the individual pixels of a flat panel display 150. The test setup utilizes a computing processor 152, which may typically be a standard personal computer, wherein processor 152 includes a commercial graphics adapter 154, which may typically be a standard Extended Graphics Adapter (EGA) modified to provide digital video output data rather than analog data.

The digital video data from processor 152 are coupled to a video data processor 156 which includes a video RAM (VRAM) 158, a multiplexer 160, a PROM 162, a digital-to-analog converter 164 and a module 166 for generating timing and control throughout the test setup. The output signal from PROM 162 is coupled via D/A converter 164 to row driver 172 in a manner generally analogous to the structure of the embodiments of FIGS. 4 and 9. In a similarly analogous manner, video data from VRAM 158 are coupled through multiplexer 160 to column driver 170. The drive currents from row driver 172 and column driver 170 provide electron emission at the pixels of display 150 of their intersecting rows and columns.

The storage and logic elements of video data processor 156 store a line or more of video data and shift it out in appropriate sequence into the display drivers 170, 172. The display 150 is refreshed a line at a time. The computing processor 152 provides programmable control over the image.

In order to develop brightness correction PROM data, a current measuring analog-to-digital converter 168 is interposed between computing processor 152 and drivers 170, 172, since it is known that display brightness is a direct result of the instantaneous beam current at each pixel. The current flowing to the drivers 170 and 172 which supply the beam current is sensed and amplified to suitable A/D levels. A settable line register in the computing processor 152 is provided to select the line being measured. When the compare circuits indicate that the desired line is being addressed, the sensed current being tracked is held and converted to a digital number by current measuring device 168, and read by computing processor 152. By programming a single pixel or a series of pixels of a line in a current "on" state, the measurement of a single pixel or group of pixels can be made, depending on the averaging desired. By sequencing through each pixel, group of pixels and lines, the current profile, corresponding to the brightness, can be measured.

Using the measured data, the PROM-stored correction factors can be computed for applications which are either unique to each individual panel, or which provide a standard correction for all panels manufactured from a specific process. In a first panel unique application, if the desired correction is by row and column, the correction can be thought of as the sum of two curved planes, one curved with respect to a first axis and the other curved with respect to a second axis orthogonal to the first. Such a scheme is depicted in the embodiment of FIG. 4 wherein illustrative correction factors are shown in FIG. 5. Once the data are collected for a panel, various statistical means can be used to develop a set of two curved planes which reduces the error to a minimum. The computing processor 152 of the FIG. 11 test setup provides an ideal, built-in means for performing this function quickly and consistently.

In a second panel unique application, if the desired correction scheme is addressed on an individual pixel basis, as depicted in the embodiment of FIG. 9, then the measured values are taken for each pixel subtracted from a reference level and converted to a desired format. In this case, each pixel (addressed by row and column) is associated with a corrected display video drive voltage to be applied in place of each desired video level.

If it is desired and deemed adequate to provide a single standard correction pattern, then a number of panels would be measured and their correction values combined in a manner so as to obtain the best set of correction patterns for a group of panels. Again, the power of the integral computing processor 152 of the test setup of FIG. 11 provides for evaluation and/or application of various statistical approaches. Panel standard correction may be applied either on a row-and-column basis, or pixel-by-pixel.

The generalized test setup of FIG. 11, used to measure values for correction of the brightness levels at the individual pixels of a display panel, may also be used to validate the resultant correction patterns.

While the principles of the present invention have been demonstrated with particular regard to the illustrated structure of the figures, it will be recognized that various departures may be undertaken in the practice of the invention. The scope of this invention is not intended to be limited to the particular structure disclosed herein, but instead be gauged by the breadth of the claims which follows.

What is claimed is:

1. In a flat panel display comprising a backing structure having a surface including a first plurality of substantially parallel conductors disposed across said surface and a second plurality of substantially parallel conductors disposed across said surface, said conductors of said first plurality intersecting said conductors of said second plurality, but electrically isolated therefrom; and further comprising means at each intersection of said first and second pluralities of conductors for emitting an electron beam current therefrom in response to a potential difference between said intersecting conductors; an apparatus for controlling the electron beam current from said emitting means at each of said intersection, said apparatus comprising:

first source means coupled to said first plurality of conductors for generating a first signal individually thereto, said first signal comprising a plurality of steps of different voltage levels;

second source means coupled to said second plurality of conductors for generating a brightness control signal thereto, said brightness control signal being driven between a first reference potential and a second reference potential in response to a binary-coded, video input signal, wherein the voltage difference between the voltage level steps of said first signal coupled individually to said first plurality of conductors and said second reference potential of said brightness control signal coupled to said second plurality of conductors generates an electron beam current from the emitting means at the intersection of the conductor of said first plurality coupled to said first source means and the conductor of said second plurality coupled to said second source means, said electron beam current varying in accordance with said voltage difference;

means coupled to said first source means for adjusting the magnitude of said first signal coupled to said first plurality of conductors, wherein the magnitude adjustment comprises a predetermined correcting quantity specific to each of said first plurality of conductors; and means coupled to said second source means for adjusting the magnitude of said brightness control signal coupled to said second plurality of conductors, wherein the magnitude adjustment comprises a predetermined correcting quantity specific to each of said second plurality of conductors.

2. The apparatus according to claim 1 wherein said first plurality of conductors comprise row conductors and said second plurality of conductors comprise column conductors, said row conductors being orthogonal to said column conductors.

3. The apparatus according to claim 1 wherein said first signal adjusting means is coupled to said first source means, said first signal adjusting means providing adjustment of the voltage levels of each of said plurality of steps for each of said first plurality of conductors.

4. The apparatus according to claim 1 wherein said brightness control signal adjusting means is coupled to said second source means, said brightness control signal adjusting means providing adjustment of said binary-coded, video input signal for each of said second plurality of conductors.

5. The apparatus according to claim 1 wherein said first signal adjusting means provides adjustment of the voltage levels of each of said plurality of steps for each of said first plurality of conductors, and said brightness control signal adjusting means provides adjustment of said binary-coded, video input signal for each of said second plurality of conductors.

6. The apparatus according to claim 1 wherein said brightness control signal adjusting means provides adjustment of said binary-coded, video input signal of reach of the intersections of said first and second pluralities of conductors.

7. The apparatus according to claim 1 wherein the voltages at each of said plurality of steps of said first signal are selected to provide successive levels of electron beam current which are related according to a binary progression.

8. The apparatus according to claim 1 wherein said first signal adjusting means includes:
 means for storing digital representations of each of said plurality of voltage level steps including said predetermined correcting quantities; and
 means responsive to said storing means for converting said digital representations into analog voltage levels.

9. The apparatus according to claim 8 wherein said storing means includes a programmable read-only memory (PROM).

10. A flat panel display comprising:
 a backing structure having a first surface including a first plurality of substantially parallel conductors disposed across said surface and a second plurality of substantially parallel conductors disposed across said surface, said conductors of said first plurality intersecting said conductors of said second plurality, but electrically isolated therefrom;
 means at each intersection of said first and second pluralities of conductors for emitting an electron beam current therefrom in response to a potential difference between said intersecting conductors;
 a face structure having a second surface adjacent said first surface including means on said second surface responsive to electron beam current for providing luminescence;
 means for controlling the electron beam current from said emitting means at each of said intersections, said controlling means including:
 first source means coupled to said first plurality of conductors for generating a first signal individually thereto, said first signal comprising a plurality of steps of different voltage levels;
 second source means coupled to said second plurality of conductors for generating a brightness control signal thereto, said brightness control signal being driven between a first reference potential and a second reference potential in response to a binary-coded, video input signal, wherein the voltage difference between the voltage level steps of said first signal coupled individually to said first plurality of conductors and said second reference potential of said brightness control signal coupled to said second plurality of conductors is sufficient to generate an electron beam current from the emitting means at the intersection of the conductor of said first plurality coupled to said first source means and the conductor of said second plurality coupled to said second source means, said electron beam current varying in accordance with said voltage difference;
 means coupled to said first source means for adjusting the magnitude of said first signal coupled to said first plurality of conductors, wherein the magnitude adjustment comprises a predetermined correcting quantity specific to each of said first plurality of conductors; and
 means coupled to said second source means for adjusting the magnitude of said brightness control signal coupled to said second plurality of conductors, wherein the magnitude adjustment comprises a predetermined correcting quantity specific to each of said second plurality of conductors.

11. The flat panel display according to claim 10 wherein said first plurality of conductors comprise row conductors and said second plurality of steps for each of said first plurality of conductors comprise column conductors, said row conductors being orthogonal to said column conductors.

12. The flat panel display according to claim 10 wherein said first signal adjusting means provides adjustment of the voltage levels of each of said plurality of conductors.

13. The flat panel display according to claim 10 wherein said brightness control signal adjusting means provides adjustment of said binary-coded, video input signal for each of said second plurality of conductors.

14. The flat panel display according to claim 10 wherein said first signal adjusting means provides adjustment of the voltage levels of each of said plurality of steps for each of said first plurality of conductors, sand said brightness control signal adjusting means provides adjustment of said binary-coded, video input signal for each of said second plurality of conductors.

15. The flat panel display according got claim 10 wherein said brightness control signal adjusting means provides adjustment of said binary-coded, video input signal for each of the intersections of said first and second pluralities of conductors.

16. The flat panel display according to claim 10 wherein the voltages at each of said plurality of steps of said first signal are selected to provide successive levels of electron beam current which are related according to a binary progression.

17. The flat panel display according to claim 10 wherein said first signal adjusting means includes:
 means for storing digital representations of each of said plurality of voltage level steps including said predetermined correcting quantities; and
 means responsive to said storing means for converting said digital representations into analog voltage levels.

18. The flat panel display according to claim 17 wherein said storing means includes a programmable read-only memory (PROM).

* * * * *